United States Patent
Hamma

[19]
[11] 3,903,756
[45] Sept. 9, 1975

[54] HYDROMECHANICAL TRANSMISSION

[75] Inventor: Karlmann Hamma, Tettnang, Germany

[73] Assignee: Zahnradfabrik Friedrichshafen Aktiengesellschaft, Friedrichshafen, Germany

[22] Filed: Feb. 14, 1974

[21] Appl. No.: 442,348

[30] Foreign Application Priority Data
Feb. 14, 1973 Germany.............................. 2307100

[52] U.S. Cl. ...................... 74/687; 60/431; 60/449; 74/720
[51] Int. Cl.² ......................................... F16H 47/04
[58] Field of Search ......... 74/687, 720; 60/431, 449

[56] References Cited
UNITED STATES PATENTS
| | | | |
|---|---|---|---|
| 2,599,814 | 6/1952 | Cull ...................................... | 74/687 |
| 3,396,607 | 8/1968 | Ross..................................... | 74/687 |
| 3,455,184 | 7/1969 | Frandsen et al. ..................... | 74/687 |

Primary Examiner—Samuel Scott
Assistant Examiner—John Reep
Attorney, Agent, or Firm—Karl F. Ross; Herbert Dubno

[57] ABSTRACT

An input shaft, driven by an engine with a predetermined range of operating speeds, is connectable to an output shaft through a power train with a mechanical branch and a hydraulic branch. First, second and third hydrostatic speed sensors on the input shaft, on an intermediate shaft and on the output shaft control the delivery rate of a reversible variable-displacement pump in the hydraulic branch through a hydraulic servomechanism. Whenever the engine operates below its normal speed range in forward drive, and at all speeds in reverse drive, the mechanical branch is ineffectual and the servomechanism responds to the output pressure of the pump and to the output pressures of the first and third speed sensors to adapt its delivery rate to the load. At a predetermined engine speed within the normal range, on forward drive, the second speed sensor becomes effective to allow a switchover to mixed hydraulic/mechanical operation as soon as the speeds of the input and intermediate shafts are equal. Thereupon, and until the engine speed drops below the normal range, the servomechanism responds only to the first and third sensors to reduce the delivery rate upon any acceleration of the input and/or output shafts.

10 Claims, 2 Drawing Figures

HYDROMECHANICAL TRANSMISSION

FIELD OF THE INVENTION

My present invention relates to a hydromechanical transmission as used, e.g. in an automotive vehicle, for driving a load from an engine having a predetermined range of operating speeds.

BACKGROUND OF THE INVENTION

Internal-combustion engines and other prime movers conventionally used in such systems, including gas turbines, cannot operate efficiently at low speeds and tend to stall whenever their speed is reduced below a certain level under load. In so-called fluid-drive systems with automatic gear shifting, therefore, it has up to now been the practice to connect an engine-driven input shaft to a load-coupled output shaft through a power train comprising a hydraulic torque converter in series with the automatic gear shifter. In comparison with systems of the manually shifted type, such automatic drives are relatively wasteful of fuel since the torque converter consumes considerable wasteful of fuel since the torque converter consumes considerable energy even at higher speeds.

OBJECTS OF THE INVENTION

It is, accordingly, the general object of my present invention to provide an improved transmission system of this nature in which the hydraulic torque converter plays only an ancillary role during certain phases of operation.

A more particular object is to ensure the shock-free transition between two modes of operation, i.e. a purely hydraulic mode and a mixed hydraulic/mechanical mode, in a system of this type.

A further object of my invention is to provide means in such a system for preventing an untimely switchover from one mode of operation to the other, e.g. during start-up or in reverse.

SUMMARY OF THE INVENTION

In accordance with my present invention, the aforementioned power train is split into two parallel branches, namely a mechanical branch and a hydraulic branch, the latter including a hydraulic torque converter constituted by a variable-displacement pump and a constant-displacement motor in tandem therewith. A preferably hydraulic servomechanism responds to speed-sensing means in the power train to establish either a first or a second operating condition. In the first operating condition the relative delivery rate of the pump, i.e. its fluid output per engine or input-shaft revolution, varies as a direct function of input-shaft speed but inversly with the load-dependent output pressure of the pump and with the speed of the output shaft; in the second operating condition, that rate varies inversely with the speed of either or both shafts independently of the pump pressure. The change from one operating condition to the other is effected by switchover means responsive to the speed-sensing means for deactivating the mechanical branch at engine speeds below the normal range and for activating (or reactivating) that branch at engine speeds within this range upon equalization of the two shaft speeds. The servomechanism is maintained by the switchover means in its first operating condition in the deactivated state and its second operating condition in the activated state of the mechanical branch of the power train.

According to a more particular feature of my invention, the power train includes an intermediate shaft adapted to be coupled to the input shaft through a first clutch, a planetary-gear coupling with a first driving element (e.g. a ring gear) coupled to the hydraulic motor, a second driving element (e.g. a planet carrier) coupled to the intermediate shaft and a driven element (e.g. a sun gear) coupled to the output shaft, as well as a second clutch which can be actuated to establish a positive driving connection between the motor and the output shaft whereby the planetary-gear coupling is locked and the intermediate shaft is directly connected to the output shaft for codirectional entrainment thereby. As long as the speed of the output shaft lags behind that of the input shaft, the second clutch is actuated to the exclusion of the first clutch under the control of a first and a second speed sensor operatively coupled with the input shaft and with the intermediate shaft, respectively; when the intermediate shaft (and therefore the output shaft rigidly coupled therewith at this stage) attains the speed of the input shaft, the system switches from purely hydraulic to mixed hydraulic/mechanical operation by actuating the first clutch to the exclusion of the second clutch. In this position, torque transmission takes place mainly through the planetary-gear coupling with no or only minor contribution from the hydraulic torque converter. At low loads, with the hydraulic motor outrunning the pump, part of the mechanically transmitted energy is fed back to the engine through the torque converter via the planetary-gear coupling.

The two aforementioned sensors and a third speed sensor, operatively coupled with the output shaft, are advantageously of the hydrostatic type so as to generate fluid pressures proportional to the speeds of their respective shafts. The pressures of the first and third generators as well as the pump pressure may be applied to respective measuring inputs of the servomechanism to act as controlling variables therefor. More specifically, the fluid pressures of the first sensor, the pump and the third sensor are delivered as first, second and third variables to their corresponding measuring inputs in a manner tending to reduce the relative delivery rate of the pump whenever these pressures increase; however, pursuant to a further feature of my invention, the pressure of the first sensor is also received by the fourth measuring input as a fourth variable overriding the effect of that pressure on the first measuring input, i.e. tending to increase the delivery rate with a rise in pressure and therefore in the speed of the input shaft. Upon switchover to the second operating condition, the second and fourth measuring inputs are cut off so that the fluid pressure of the first sensor is now oppositely effective to vary the pumping rate inversely with input-shaft speed, in aiding relationship with the fluid pressure of the third sensor which has a similar effect upon the pumping rate in response to the speed of the output shaft.

If the pump is reversible, i.e. if the relative sense of rotation of motor and pump can be changed with the aid of a suitable control member such as a manually operable lever, the second sensor has a negative or zero output whenever the sense of rotation of the intermediate shaft is opposite that of the input shaft. Under these circumstances, therefore, the fluid pressure of the second sensor cannot match that of the first sensor at any speed so that no switchover occurs and the system operates in its purely hydraulic mode under all load conditions.

Pursuant to yet another feature of my invention, the first sensor establishes a critical speed level within the normal range below which no switchover to mixed operation can occur. This can be accomplished with the aid of a disabling circuit which, at engine speeds below that threshold, makes the second sensor ineffectual so that the first clutch cannot be actuated and the mechanical branch of the power train remains inoperative. By this means I am able to insure that the hydraulic torque converter remains fully effective until the engine has reached its normal speed range. The cancellation of the disablement of the second sensor preferably occurs at a speed somewhat below the nominal engine speed at which the prime mover delivers its maximum torque to the input shaft. There is then still available a substantial part of the normal speed range for accelerating the input shaft during mixed operation.

BRIEF DESCRIPTION OF THE DRAWING

The above and other features of my invention will now be described in detail with reference to the accompanying drawing in which.

SPECIFIC DESCRIPTION

Figure 1:
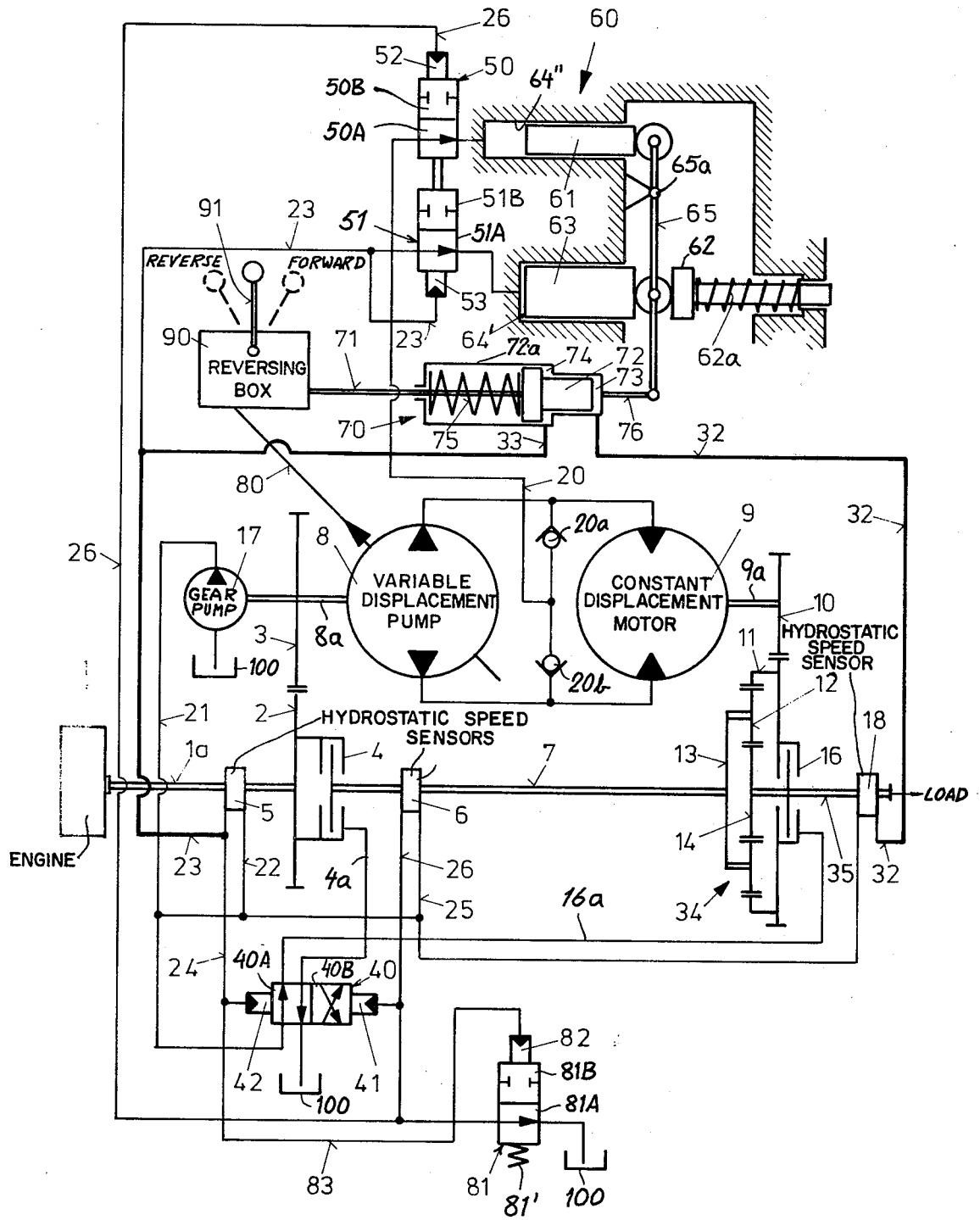
FIG. 1 is an overall diagrammatic view of a hydromechanical transmission embodying my invention.

The system shown in the drawing is a hydromechanical transmission designed to drive a nonillustrated load which may be a traction-wheel shaft of an automotive vehicle connected to that system through the intermediary of nonillustrated automatic gear-shifting means such as one or more planetary-gear trains as is well known per se.

An engine 1 (e.g. a gas turbine) drives an input shaft 1a having a gear 2 keyed thereto, this gear meshing with another gear 3 which drives a variable-displacement pump 8 in tandem with a constant-displacement motor 9. Units 8 and 9 form part of a hydraulic torque converter whose leakage losses are replaced, over nonillustrated fluid circuits, by a constant-flow gear pump 17 mounted on the shaft 8a of pump 8. Several such pump-motor assemblies may be connected in parallel if required for greater capacity. Gear pump 17 also works into a conduit 21 feeding three hydrostatic speed sensors, i.e. a first sensor 5 on input shaft 1a, a second sensor 6 on an intermediate shaft 7 and a third sensor 18 on an output shaft 35. Shafts 1a and 7 can be interconnected by a first clutch 4 whose hydraulic supply line 4a terminates at a port of a differential valve 40 normally (i.e. in the illustrated position) draining that line to an oil sump 100. The shaft 9a of motor 9 carries a gear 10 in mesh with a ring gear 11 of a planetary-gear coupling 34 whose planet carrier 13 is keyed to shaft 7 and whose sun gear 14 is keyed to shaft 35. A second clutch 16, actuatable via valve 40 by way of a hydraulic line 16a, bridges the planetary-gear coupling 34 and, when operated, prevents relative rotation of ring gear 11, sun gear 14 and carrier 13 whose planetary gears 12 are in mesh with gears 11 and 14. In this locked state, shafts 7 and 35 are directly interconnected so as to turn codirectionally and at a speed related to that of motor shaft 9a by the tooth ratio of gears 10 and 11.

Valve 40 has two control inputs 41 and 42 connected to respective output lines 26 and 24 of speed sensors 6 and 5. Line 26 also extends to a control input 52 of a dual differential valve 50-51 whose control input 53 is connected to line 23. A bypass valve 81, loaded by a spring 81', has a control input 82 connected to a branch 83 of line 24. At zero or low speeds of input shaft 1a, the pressure in line 83 is insufficient to overcome the force of spring 81' so that section 81A of valve 81 drains the line 26 to the sump 100. At the same time, valves 40 and 50-51 are in their illustrated positions whereby the output of pump 17 is connected through valve section 40A and line 16a to clutch 16 which is thus actuated. Valve section 51A is aligned with conduit 23 so as to transmit the fluid pressure of sensor 5 to a piston 63 in a cylinder 64' forming part of a servomechanism 60; at the same time, valve section 50A communicates with a conduit 20, emanating from torque converter 8, 9, to transmit the output pressure of pump 8 to another cylinder 64'' of servomechanism 60 containing a piston 61. The two pistons 61 and 63 bear upon an operating lever 65 on opposite sides of its fulcrum 65a, this lever being biased in a clockwise sense by a plunger 62 under pressure of a spring 62a.

Speed sensor 18 has an output line 32 opening into a hydraulic cylinder 72a adjacent a land 73 of a stepped piston 72 which is biased to the right by a spring 75; another land 74 of piston 72 confronts a port at the end of a branch line 33 of conduit 23. Fluid pressure in lines 32 and 33 opposes the action of spring 75 by urging the piston 72 to the left. Such leftward motion also results from pressurization of cylinder 64'' via line 20 whereas the admission of fluid from line 23 to cylinder 64' has the opposite effect. The terminations of lines 33, 20, 32 and 23 constitute first, second, third and fourth measuring inputs receiving the controlling variables for servomechanism 60.

Cylinder 72a and piston 72 form part of a link 70 in a mechanical connection between the operating lever 65 and a control lever 80 for the adjustment of the delivery rate of pump 8. This linkage further includes a stem 76 rigid with cylinder 72a and a rod 71 extending from the stepped piston. This piston rod 71 is coupled to lever 80 within a box 90, more fully described hereinafter with reference to FIG. 2, which is provided with a reversing lever 91 acting as a position modifier for lever 80. Pump 8 is of the well-known type having a stationary plate which is tiltable, with reference to a transverse plane perpendicular to its shaft, so as to vary its delivery rate (with a given speed of shaft 8a) as a function of the tilt angle. The plate has two limiting positions, symmetrical with reference to the transverse plane, in which the tilt angle has its maximum positive or negative value corresponding to forward or reverse drive. Manual shifting of lever 91 thus enables the selection of the direction of rotation of motor shaft 9a, and therefore of shafts 7 and 35, as clutch 16 is actuated.

At low engine speeds, e.g. on start-up, the output pressure of speed sensor 5 is low and valves 40, 50, 51 and 81 are in their illustrated positions. Clutch 4 is released and clutch 16 is actuated whereby torque is transmitted from input shaft 1a via gears 2 and 3, converter 8, 9, gears 10 and 11 as well as clutch 16 to output shaft 35. The fluid pressure in line 23 acts upon piston 63, thereby tending to shift the cylinder 72a to the right; this overrides the effect of the same pressure on land 74 of piston 72 urging the latter to the left. As the engine speed rises, therefore, piston rod 71 moves to the right to increase the tilt angle of pump 8, and therefore its delivery rate, to the extent permitted by the load-dependent reaction pressure in line 20 and the fluid pressure from sensor 18, proportional to the output-shaft speed, in line 32. These latter two fluid pressures are additively combined in opposing such a rightward shift. The progressively increasing relative delivery rate adapts the torque of pump 8 to that of engine 1, allowing the engine to accelerate at a rate determined by the existing load conditions.

When the shaft 1a reaches a predetermined number of RPM, well within the normal speed range of the engine but preferably a little below the nominal or rated speed thereof, the pressure in line 83 shifts the valve 81 whose section 81B now disconnects the output line 26 of sensor 6 from sump 100 whereby fluid pressure commensurate with the speed of shaft 7 develops in line 26. In order to account for unavoidable losses and frictional resistance, the effective area of the valve body at its control input 41 slightly exceeds that at the opposite control input 42 so that valve 40 shifts into its alternate position at the instant when the speed of shaft 7 matches that of shaft 1a. Similarly, the body of valve 50 exposes a slightly larger area at control input 52 than does the body of valve 52, rigid with the former, at control input 53 so that this dual valve now shifts into its alternate position substantially simultaneously with valve 40. In these alternate positions, valve section 40B confronts the lines 4a and 16a so as to drain the clutch 16 and to pressurize the clutch 4 while valve sections 50B and 51B cut off the cylinders 64'' and 64' from lines 20 and 23, respectively.

With clutch 4a now active and clutch 16 released, torque is transmitted mechanically from input shaft 1a to intermediate shaft 7 and thence, via planetary-gear coupling 34, to output shaft 35. At the instant of switchover, occurring at or near the point at which the engine 1 delivers its maximum torque, motor shaft 9a evidently has the speed necessary to make the speed of shafts 7 and 35 equal to that of shaft 1a; the adjustment of the pump-controlling lever 80 corresponding to the speed ratio between shafts 8a and 9a now remains fixed, as long as the shaft speeds are not changed, in view of the disconnection of cylinders 64' and 64'' from their fluid sources. The maximum delivery rate of pump 8 is advantageously somewhat larger than the intake rate of motor 9 so that an excess is always available for feeding the line 20 by way of a pair of check valves 20a, 20b.

If the driver steps on the gas pedal to accelerate the engine beyond its switchover speed, the increased fluid pressure in line 23 shifts the piston 72 leftward to reduce the tilt angle so that the speed ratio of ring gear 11 to planet carrier 13 is decreased. This, in turn, increases the speed ratio of sun gear 14 to planet carrier 13, with resulting relative acceleration of output shaft 35 and a rising fluid pressure in line 32 superimposed on that in line 33 to extend the shift until a new state of equilibrium is reached. With the tilt angle reduced to zero, i.e. with the pump 8 idling, the angular velocity of shaft 35 is more than twice that of shafts 1a and 7. Upon a further leftward shift of rod 71, the tilt angle assumes negative values and shaft 9a rotates in the opposite sense, establishing a still higher speed ratio.

As long as the throttle position at engine 1 and the load connected to output shaft 35 are such that input shaft 1a can turn at a speed above the critical threshold, the system remains in this operating condition and the position of valves 40, 50-51 and 81 does not change. When, however, the oil pressure in line 24 falls below the biasing force of spring 81', valve 81 disables the speed sensor 6 whereupon the other valves also return to their original positions illustrated in FIG. 1. Clutch 4 is thereby released while clutch 16 is actuated to restore the purely hydraulic power train via torque converter 8, 9. Engine 1 still operates within its normal speed range under these circumstances; with its nonillustrated automatic gear shifter driven by output shaft 35, the system then functions like a conventional stepless transmission. If lever 91 is moved from forward to reverse, this hydraulic mode of operation will be maintained even at higher engine speeds inasmuch as a shift of valve 81 to its alternate position will not cause any pressure buildup in line 26.

Figure 2:
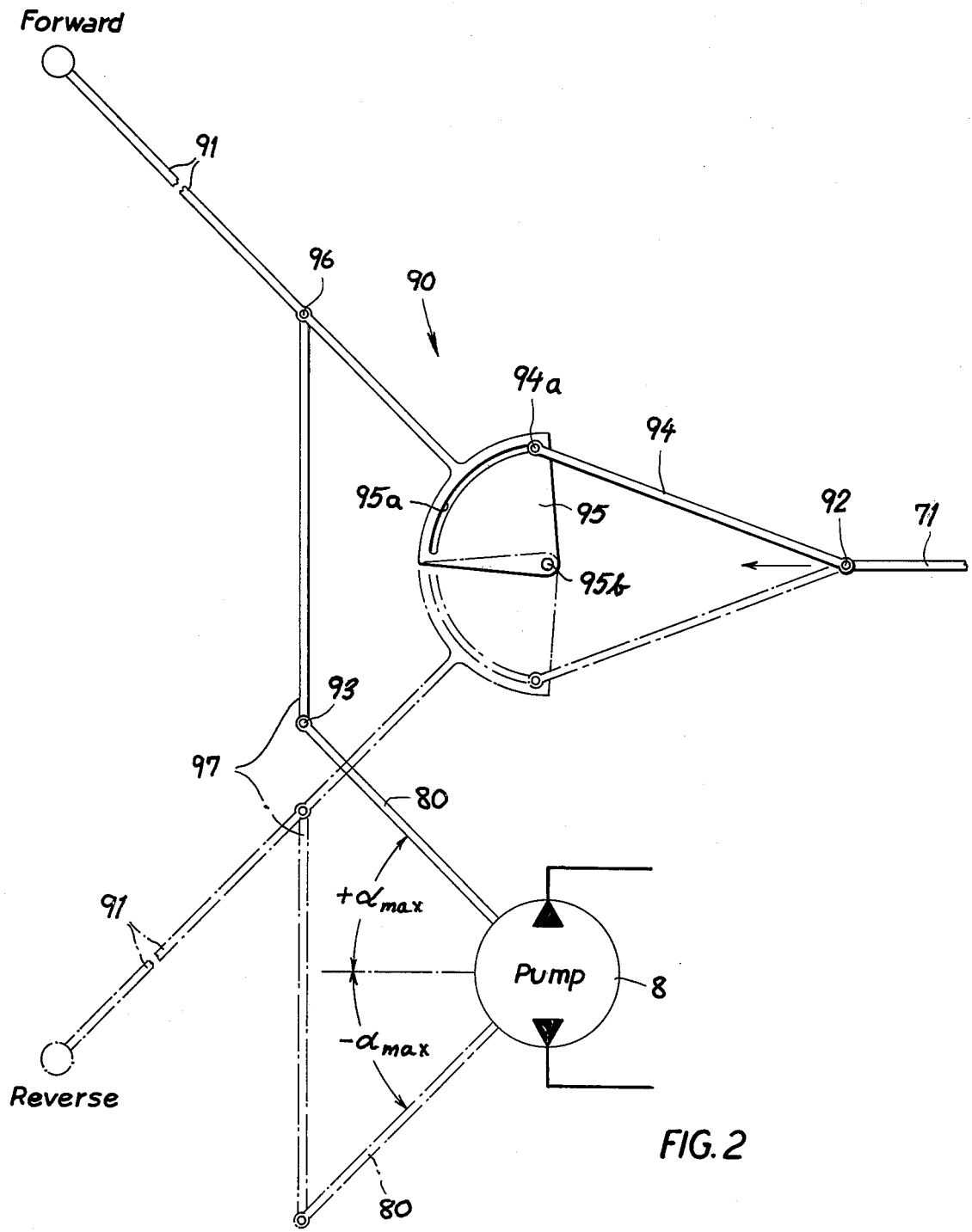
FIG. 2 is a more detailed illustration of a component of that system.

In FIG. 2 I have shown details of a possible construction of reversing box 90. Lever 91 is rigid with a quadrantal segment 95 which is provided with an arcuate groove 95a and is swingable about a fulcrum 95b, groove 95a being slidably engaged by a pin 94a at the end of an arm 94 articulated at 92 to piston rod 71 in line with fulcrum 95b. In the forward position of lever 91 illustrated in solid lines, and with piston rod 71 fully retracted to the right by the spring 75 in the absence of countervailing fluid pressures, a rod 97 articulated at 93 to lever 80 and at 96 to lever 91 moves the tilt plate of pump 8 into one limiting position corresponding to a tilt angle $+\alpha_{max}$; this tilt angle is subsequently reduced as the piston rod 71 is displaced to the left upon switchover to mixed operation, as described above, arm 94 exerting through pin 94a a force upon segment 95 which swings the same counterclockwise about its fixed fulcrum 95b. The swing could carry the lever 80 into or even past the idling position ($\alpha = 0$).

If the lever 91 is swung manually through about 90° into the reverse position illustrated in phantom lines in FIG. 2, arm 94 pulls the rod 71 to the left against the force of its loading spring 75 (FIG. 1) until the arm clears the dead-center position whereupon the spring, with toggle action, pulls back the piston while pin 94a lodges in the lower end of groove 95a. This places the tilt plate in its alternate limiting position corresponding to a tilt angle $-\alpha_{max}$; a subsequent leftward shift of piston rod 71, which may occur under certain driving conditions, reduces the absolute value of this tilt angle as in the previous instance.

From FIG. 1 it will be noted that spring 62a initially holds the cylinder 72a in an intermediate position from which it can move to either side, depending on the relative magnitudes of the pressures transmitted to cylinders 64' and 64''. The large cross-sectional area of piston 63 insures that the tilt plate is in its position $+\alpha_{max}$ at the instant of switchover, the counter-vailing pressures in lines 20, 32 and 33 notwithstanding. With cutoff of line 23 by valve 51, the tilt angle decreases immediately and torque transmission takes place primarily or exclusively through the mechanical branch 4, 7, 34 of the power train.

I claim:

1. A hydromechanical transmission for driving a load from an engine having a predetermined range of operating speeds, comprising:
an input shaft coupled to said engine;
an output shaft coupled to said load;
a power train between said input and output shafts including a mechanical branch and a hydraulic branch;
a hydrostatic torque converter in said hydraulic branch including a variable-displacement pump and a constant-displacement motor in tandem therewith;
speed-sensing means in said power train;
servo-control means for said pump connected to said speed-sensing means and to said torque converter for making the delivery rate of said pump per input-shaft revolution dependent on the output pressure of said pump and on the speeds of said shafts, said servo-control means having a first operating condition for varying said delivery rate directly with the speed of said input shaft and inversely with said output pressure and with the speed of said output shaft, said servo-control means further having a second operating condition for varying said delivery rate inversely with the speed of either of said shafts independently of said output pressure; and
switchover means in said power train responsive to said speed-sensing means for deactivating said mechanical branch at engine speeds below said range and for activating said mechanical branch at engine speeds within said range upon equalization of the speeds of said input and output shafts, said servo-control means being coupled to said switchover means for assuming said first operating condition in the deactivated state and said second operating condition in the activated state of said mechanical branch.

2. A hydromechanical transmission as defined in claim 1 wherein said power train includes an intermediate shaft, first clutch means actuatable to couple said intermediate shaft to said input shaft, planetary-gear means with a first driving element coupled to said motor, a second driving element coupled to said intermediate shaft and a driven element coupled to said output shaft, and a second clutch means actuatable to establish a positive driving connection between said motor and said output shaft with consequent entrainment of said intermediate shaft at the speed and in the direction of said output shaft; said speed-sensing means including a first sensor operatively connected with said input shaft and a second sensor operatively connected with said intermediate shaft; said switchover means being connected to said first and second sensors for actuating said second clutch means to the exclusion of said first clutch means upon the speed of said input shaft exceeding that of said intermediate shaft and for actuating said first clutch means to the exclusion of said second clutch means upon said intermediate shaft attaining the speed of said input shaft.

3. A hydromechanical transmission as defined in claim 2, further comprising disabling means responsive to said first sensor for making said second sensor ineffectual at engine speeds below a predetermined speed threshold within said range.

4. A hydromechanical transmission as defined in claim 2 wherein said torque converter is provided with reversing means for selectively changing the direction of rotation of said motor, said switchover means being responsive to equality of the speeds of said input and intermediate shafts only upon codirectional rotation thereof.

5. A hydromechanical transmission as defined in claim 2 wherein said first driving element is a ring gear, said second driving element is a sun gear, and said driven element is a planet carrier having at least one planet gear in mesh with said ring and sun gears.

6. A hydromechanical transmission as defined in claim 2 wherein said speed-sensing means further includes a third sensor operatively connected with said output shaft, said servo-control means having a first measuring input connected to said first sensor for receiving a first variable tending to reduce said delivery rate with a rise in the speed of said input shaft, a second measuring input connected to said pump for receiving a second variable tending to reduce said delivery rate with a rise in said output pressure, a third measuring input connected to said third sensor for receiving a third variable tending to reduce said delivery rate with a rise in the speed of said output shaft, and a fourth measuring input connected to said first sensor for receiving a fourth variable tending to increase said delivery rate with a rise in the speed of said input shaft, said fourth variable overriding said first variable in said first operating condition; said second and fourth measuring inputs being provided with cutoff means making said second and fourth variables ineffectual in said second operating condition.

7. A hydromechanical transmission as defined in claim 6 wherein said sensors are generators of hydrostatic pressures proportional to shaft speed.

8. A hydromechanical transmission as defined in claim 7 wherein said pump is provided with a control member for changing said delivery rate, said servo-control means comprising an operating member responsive to fluid pressures from said pump and from said first sensor representing said second and fourth variable, said servo-control means further comprising a mechanical connection between said operating member and said control member, said connection including a link of variable effective length adjustable in aiding relationship by fluid pressures from said first and third sensors constituting said first and third variables.

9. A hydromechanical transmission as defined in claim 8 wherein said link comprises a cylinder and a stepped piston in said cylinder with two lands respectively exposed to the fluid pressures from said first and third sensors.

10. A hydromechanical transmission as defined in claim 8 wherein said pump is reversible by shifting said control member between two alternate positions, said connection further including a position modifier in tandem with said link for reversing said pump.

* * * * *